United States Patent [19]
Madsen et al.

[11] Patent Number: 5,456,483
[45] Date of Patent: Oct. 10, 1995

[54] ANTI-JACKKNIFE APPARATUS FOR TRACTOR TO TRAILER CONNECTIONS

[76] Inventors: Harold A. Madsen, 126 E. Shubert, Glendale Heights, Ill. 60139; David H. Madsen, 1963 Rolling Green Cir., Sarasota, Fla. 34240

[21] Appl. No.: 238,697

[22] Filed: May 5, 1994

[51] Int. Cl.$^6$ ............................................. B62D 53/08
[52] U.S. Cl. ............................. 280/432; 280/446.1
[58] Field of Search ................................ 280/432, 433, 280/455.1, 474, 446.1, 449

[56] References Cited

U.S. PATENT DOCUMENTS

| | | | |
|---|---|---|---|
| D. 323,804 | 2/1992 | Randolph | D12/161 |
| 3,136,566 | 6/1964 | Harding | 280/432 |
| 3,420,547 | 1/1969 | Strausser | 280/432 |
| 3,430,986 | 3/1969 | Long | 280/432 |
| 3,774,941 | 11/1973 | Durr | 280/432 |
| 4,120,514 | 10/1978 | Sanders | 280/432 |
| 4,341,395 | 7/1982 | Miller et al. | 280/432 |
| 4,438,943 | 3/1984 | Hebert | 280/432 |
| 4,556,232 | 12/1985 | Sever | 280/432 |
| 4,573,699 | 3/1986 | Smith | 280/432 |
| 4,585,248 | 4/1986 | Miller et al. | 280/432 |
| 4,720,118 | 1/1988 | Schultz et al. | 280/432 |
| 4,991,863 | 2/1991 | Hosmer | 280/432 |

FOREIGN PATENT DOCUMENTS

962172  7/1964  United Kingdom .................. 280/432

Primary Examiner—Karin L. Tyson
Assistant Examiner—Kevin Hurley

[57] ABSTRACT

A new and improved anti-jackknife apparatus for tractor to trailer connections includes a fifth wheel assembly connected to a tractor and a pair of locking pin assemblies connected to the fifth wheel assembly. Each of the locking pin assemblies includes an extensible and retractable lock pin. A control assembly is connected to the pair of locking pin assemblies. The control assembly is capable of being controlled by a first control signal in response to actuation of tractor brakes and is capable of being controlled by a second control signal in response to manual actuation of a bypass switch assembly by a tractor driver. A plate is connected to a trailer such that the trailer plate encircles a kingpin extending downward from the trailer. The trailer plate includes a pair of partially-ring-shaped slots adapted to receive the lock pins of the locking pin assemblies when the lock pins are in an extended position. The partially-ring-shaped slots are of a predetermined size and are oriented on the trailer such that when the lock pins of the locking pin assemblies are in engagement with respective ends of the partially-ring-shaped slots, a longitudinal axis of the trailer is oriented no greater than an acute angle of rotation either clockwise or counterclockwise from a longitudinal axis of the tractor. The acute angle of rotation between the longitudinal axis of the trailer and the longitudinal axis of the tractor is no greater than fifteen degrees.

6 Claims, 5 Drawing Sheets

ANTI-JACKKNIFE APPARATUS FOR TRACTOR TO TRAILER CONNECTIONS

BACKGROUND OF THE INVENTION

1. Field of the Invention

The present invention relates generally to devices for preventing a trailer from jackknifing with respect to a tractor and, more particularly, to an anti-jackknife device which is automatically actuated when the brakes of the tractor are applied.

2. Description of the Prior Art

A jackknife is a known condition wherein a trailer follows a tractor in such a way that the longitudinal axis of trailer is oriented with respect to the longitudinal axis of the tractor at an angle of 90 degrees or more. The jackknife condition is often caused to occur when brakes are applied to both the tractor and the trailer, but the effective braking action of the trailer is less than that of the tractor. As a result, the unbraked momentum of the trailer causes the trailer to push up against the tractor causing the rear of the tractor to swing out with respect to the front of the tractor. When a resulting angle is formed between the longitudinal axis of the tractor and the longitudinal axis of the trailer that is 90 degrees or less, the jackknife condition occurs. The jackknife condition is a seriously dangerous condition for a number of reasons. The tractor and trailer move laterally out of theft normal lane path. The driver of the tractor loses control of the tractor and trailer. The tractor and trailer have an increased tendency to flip over.

Throughout the years, a number of innovations have been developed relating to anti-jackknife devices, and the following U.S. Pat. Nos. are representative of some of those innovations: 3,420,547; 3,430,986; 3,774,941; 4,991,863; and Des. 323,804. More specifically, U.S. Pat. No. 3,420,547 discloses an anti-jackknife device that employs hydraulically operated retractable rods that keep the trailer in a straight-line condition with respect to the tractor. A significant disadvantage with the anti-jackknife device is that the straight-line condition is too restrictive for normal operation of a tractor and trailer. Often roads curve, and the straight-line condition may be too restrictive for successfully following a curve in the road without disabling the system. In this respect, it would be desirable if an anti-jackknife device were provided which did not maintain a tractor and trailer in a straight-line orientation.

U.S. Pat. No. 3,430,986 discloses an anti-jackknife device which includes hydraulically operated brake shoes and a clutch plate for preventing relative rotation between the tractor and the trailer. The hydraulically operated brakes shoes are carried entirely by the trailer, and the clutch plate is on the tractor. Two significant disadvantages are associated with this device. First, effective anti-jackknife operation between the brake shoes and the clutch plate depend upon a high coefficient of friction between the two surfaces. Such a high coefficient of friction may be rapidly diminished in the presence of grease from the fifth wheel and in the presence of water from rain or snow. In this respect, it would be desirable if an anti-jackknife device were provided which does not depend upon a high coefficient of friction between two braking surfaces for proper operation.

A second disadvantage with the anti-jackknife device in U.S. Pat. No. 3,430,986 is the fact that much of the device is carried by the trailer as opposed to the tractor. The number of trailers in use is far more numerous than the number of tractors. As a result, many trailer remain idle while tractors are very much utilized. It seems to be an overly expensive proposition to equip trailers with so much of the anti-jackknife device. In this respect, it would be desirable if an anti-jackknife device were provided which were mostly carried by the tractor as opposed to the trailer.

U.S. Pat. No. 3,774,941 discloses an anti-jackknife device which operates with a conventional fifth wheel on the tractor and operates with a conventional tractor having a kingpin which fits into the fifth wheel. A plurality of hydraulically operated locking arms are operated by hydraulic brakes which are automatically operated by the tractor brake system when the tractor brake system is actuated. The locking arms engage recesses in the underside of the trailer. A disadvantage associated with this device is the use of the lever arms and the complementary recesses. The recesses are discrete receptacles for the ends of the locking arms. Consequently, the ends of the locking arms on the tractor and the recesses in the trailer must be placed in discrete registration with each other for the ends of the locking arms to engage the discrete recesses. For this to occur, when the brakes of the tractor are applied, the tractor and the trailer must be in a specific alignment. In actual practice, however, the required specific alignment between the tractor mid the trailer may not be present when the brakes of the tractor are applied and the anti-jackknife locking arms are actuated. The tractor and trailer may be going around a curve in the road when the brakes are applied. If such is the case, the locking arms on the tractor may not engage the recesses on the trailer. In this respect, it would be desirable if an anti-jackknife device were provided which does not depend upon a specific alignment between a tractor and a trailer to be present when the brakes are applied. Also, in this regard, it would be desirable if an anti-jackknife device were provided which is operable when the tractor and trailer are riding on a curve in the road.

U.S. Pat. No. 4,991,863 discloses an anti-jackknife device that employs a retractable latch block employed on the tractor and a plurality of stop blocks employed on the trailer. There are a left stop block and a fight stop block. When a jackknife is about to occur to the left, then one stop block will function, and the other will remain unused. Similarly, when a jackknife is about to occur to the right, then one stop block will function, and the other will remain unused. Each stop block serves to prevent a jackknife in only one direction. For a number of reasons, it would be desirable to spread anti-jackknife forces to more than none stopping device. Safety often demands redundancy, and such redundancy is not present with the device disclosed in U.S. Pat. No. 4,991,863. In this respect, it would be desirable if an anti-jackknife device were provided which spreads anti-jackknifing forces to both a right side and a left side in a redundant manner whether the jackknife is occurring to the right side or the left side.

U.S. Pat. No. Des. 323,804 may also be of interest for its disclosure of an ornamental design for an anti-jackknife device.

Still other features would be desirable in an anti-jackknife apparatus for tractor and trailer connections. For example, there are occasions when brakes may be applied by a driver, and the orientation between the tractor and the trailer is 90 degrees or less. Such conditions often occur when the tractor and trailer are being maneuvered to a loading dock. In this respect, it would be desirable if an anti-jackknife device were provided which can be bypassed when the tractor and trailer are being maneuvered to a loading area.

In addition, the enabling or the disabling of the anti-jackknife apparatus for tractor to trailer connections should be easily accomplished by the tractor driver with the mere actuation of an electrical switch.

Thus, while the foregoing body of prior art indicates it to be well known to use anti-jackknife devices for tractors and trailers, the prior art described above does not teach or suggest an anti-jackknife apparatus for tractor to trailer connections which has the following combination of desirable features: (1) does not maintain a tractor and trailer in a straight-line orientation; (2) does not depend upon a high coefficient of friction between two braking surfaces for proper operation; (3) is mostly carried by the tractor as opposed to the trailer; (4) does not depend upon a specific alignment between a tractor and a trailer to be present when the brakes are applied; (5) is operable when the tractor and trailer are riding on a curve in the road; (6) spreads anti-jackknifing forces to both a right side and a left side in a redundant manner whether the jackknife would occur to the tight side or the left side; (7) can be bypassed when the tractor and trailer are being maneuvered to a loading area; and (8) enabling or disabling the anti-jackknife apparatus is easily accomplished by the tractor driver with the mere actuation of an electrical switch. The foregoing desired characteristics are provided by the unique anti-jackknife apparatus for tractor to trailer connections of the present invention as will be made apparent from the following description thereof. Other advantages of the present invention over the prior art also will be rendered evident.

SUMMARY OF THE INVENTION

To achieve the foregoing and other advantages, the present invention, briefly described, provides a new and improved anti-jackknife apparatus for tractor to trailer connections which includes a fifth wheel assembly connected to a tractor and a pair of locking pin assemblies connected to the fifth wheel assembly. Each of the locking pin assemblies includes an extensible and retractable lock pin. A control assembly is connected to the pair of locking pin assemblies. The control assembly is capable of being controlled by a first control signal in response to actuation of tractor brakes and is cap,able of being controlled by a second control signal in response to manual actuation of a bypass switch assembly by a tractor driver. A plate is connected to a trailer such that the trailer plate encircles a kingpin extending downward from the trailer. The trailer plate includes a pair of partially-ring-shaped slots adapted to receive the lock pins of the locking pin assemblies when the lock pins are in an extended position.

The partially-ring-shaped slots are of a predetermined size and are oriented on the trailer such that when the lock pins of the locking pin assemblies are in engagement with respective ends of the partially-ring-shaped slots, a longitudinal axis of the trailer is oriented no greater than an acute angle of rotation either clockwise or counterclockwise from a longitudinal axis of the tractor. The acute angle of rotation between the longitudinal axis of the trailer and the longitudinal axis of the tractor is no greater than fifteen degrees.

The fifth wheel assembly includes a pair of lock pin receiving apertures, and each of the locking pin assemblies includes a housing assembly that is connected to the fifth wheel assembly and includes an extensible and retractable lock pin that is capable of extending out from and retracting in toward the housing assembly. The housing assembly is connected to the fifth wheel assembly such that the lock pin is placed in registration with a respective lock pin receiving aperture on the fifth wheel assembly.

A hydraulic pump assembly, supported by the tractor, is driven by power from a tractor motor. An electrically-controlled valve assembly is controlled by the control assembly and is in hydraulic communication with the hydraulic pump assembly, for providing hydraulic power from the hydraulic pump assembly to the locking pin assemblies. Each of the locking pin assemblies includes a hydraulically powered drive assembly housed within the housing assembly for extending and retracting the respective lock pins.

The electrically-controlled valve assembly includes a pair of first electrically-controlled valves for driving the lock pins to the retracted position and includes a pair of second electrically-controlled valves for driving the lock pins to the extended position.

The control assembly also includes a brake-pressure-responsive switch assembly connected to a hydraulic line in a tractor brake system. The brake-pressure-responsive switch assembly provides the first control signal in response to actuation of tractor brakes. A bypass switch assembly is located in a tractor cab and provides the second control signal in response to manual actuation by a tractor driver. A reset switch assembly is located in the tractor cab and, when manually actuated, provides a reset signal for return of status of the apparatus from a bypass mode to a normal mode.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining a preferred embodiment of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

It is therefore an object of the present invention to provide a new and improved anti-jackknife apparatus for tractor to trailer connections which has all of the advantages of the prior art and none of the disadvantages.

It is another object of the present invention to provide a new and improved anti-jackknife apparatus for tractor to trailer connections which may be easily and efficiently manufactured and marketed.

It is a further object of the present invention to provide a new and improved anti-jackknife apparatus for tractor to trailer connections which is of durable and reliable construction.

An even further object of the present invention is to provide a new and improved anti-jackknife apparatus for tractor to trailer connections which is susceptible of a low cost of manufacture with regard to both materials and labor, and which accordingly is then susceptible of low prices of sale to the consuming public, thereby making such anti-jackknife apparatus for tractor to trailer connections available to the buying public.

Still yet a further object of the present invention is to provide a new and improved anti-jackknife apparatus for tractor to trailer connections which does not maintain a tractor and trailer in a straight-line orientation.

Still another object of the present invention is to provide a new and improved anti-jackknife apparatus for tractor to trailer connections that does not depend upon a high coefficient of friction between two braking surfaces for proper operation.

Yet another object of the present invention is to provide a new and improved anti-jackknife apparatus for tractor to trailer connections which is mostly carried by the tractor as opposed to the trailer.

Even another object of the pre, sent invention is to provide a new and improved anti-jackknife apparatus for tractor to trailer connections that does not depend upon a specific alignment between a tractor and a trailer to be present when the brakes are applied.

Still a further object of the present invention is to provide a new and improved anti-jackknife apparatus for tractor to trailer connections which is operable when the tractor and trailer are riding on a curve in the road.

Yet another object of the present invention is to provide a new and improved anti-jackknife .apparatus for tractor to trailer connections that spreads anti-jackknifing forces to both a right side and a left side in a redundant manner whether the jackknife would occur to the right side or the left side.

Still another object of the present invention is to provide a new and improved anti-jackknife apparatus for tractor to trailer connections which can be bypassed when the tractor and trailer are being maneuvered to a loading area.

Yet another object of the present invention is to provide a new and improved anti-jackknife apparatus for tractor to trailer connections that enabling or disabling the anti-jackknife apparatus is easily accomplished by the tractor driver with the mere actuation of an electrical switch.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference, should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein.

DESCRIPTION OF THE PREFERRED EMBODIMENT

With reference to the drawings, a new and improved anti-jackknife apparatus for tractor to trailer connections embodying the principles and concepts of the present invention will be described.

Figure 6:
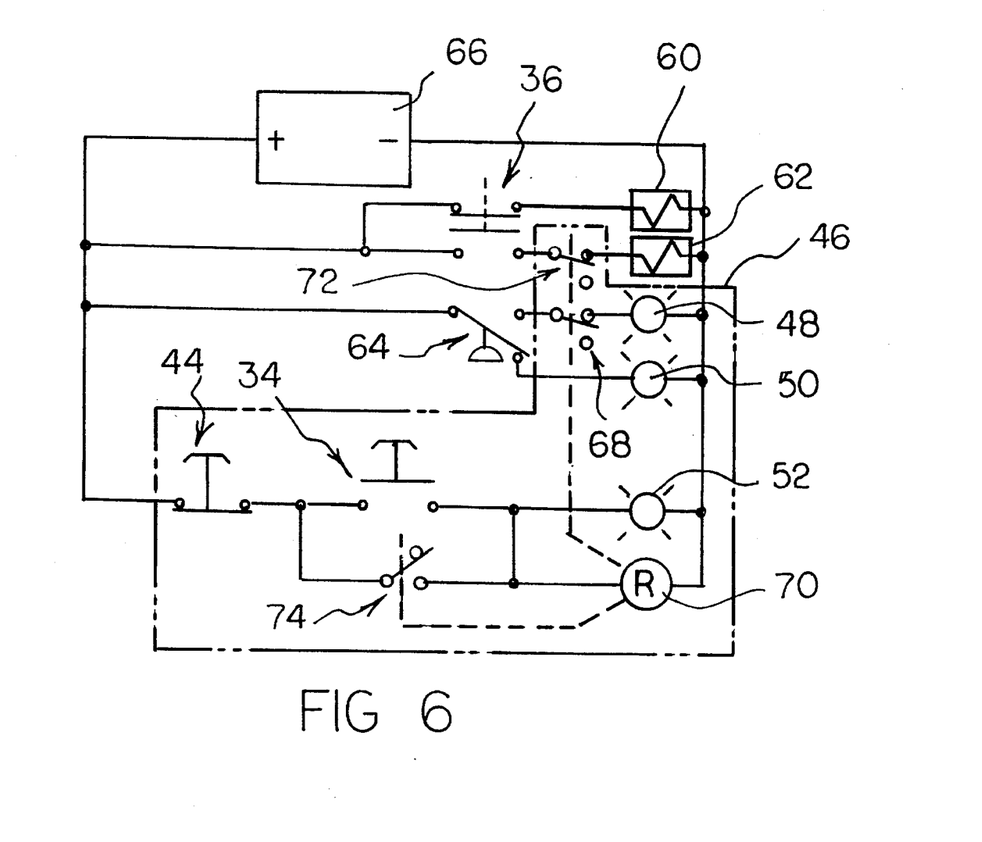
FIG. 6 is an electrical schematic diagram of the circuit for operating the embodiment of the invention shown in FIG. 1.

Turning to the FIGS. 1–10, there is shown an exemplary embodiment of the anti-jackknife apparatus for tractor to trailer connections of the invention generally designated by reference numeral 10. In its preferred form, anti-jackknife apparatus 10 for tractor to trailer connections includes a fifth wheel assembly 12 connected to a tractor 14 and a pair of locking pin assemblies 18 connected to the fifth wheel assembly 12. Each of the locking pin assemblies 18 includes an extensible and retractable lock pin 22. The lock pin 22 is shown in solid lines in FIG. 4 in the retracted position and is shown in broken lines in the extended position. Lock pins 22 are also shown in solid lines in FIGS. 2 and 3 in the extended position control assembly, as shown in greatest detail in FIG. 6, is connected to the pair of locking pin assemblies 18. The control assembly is capable of being controlled by a first control signal in response to actuation of tractor brakes and is capable of being controlled by a second control signal in response to manual actuation of a bypass switch assembly 34 by a tractor driver. A plate 24, as shown best in FIGS. 5 and 8–10, is connected to a trailer 26 such that the trailer plate 24 encircles a kingpin 28 extending downward from the trailer 26. The trailer plate 24 includes a pair of partially-ring-shaped slots 30 adapted to receive the lock pins 22 of the locking pin assemblies 18 when the lock pins 22 are in an extended position.

Before a bypass switch assembly 34 is activated, the apparatus of the invention is in a normal mode in which application of the tractor brakes causes activation of the locking pin assemblies 18 and extension of the lock pins 22. However, once the bypass switch assembly 34 is activated, the apparatus of the invention is placed in a bypass mode.

Figure 8:
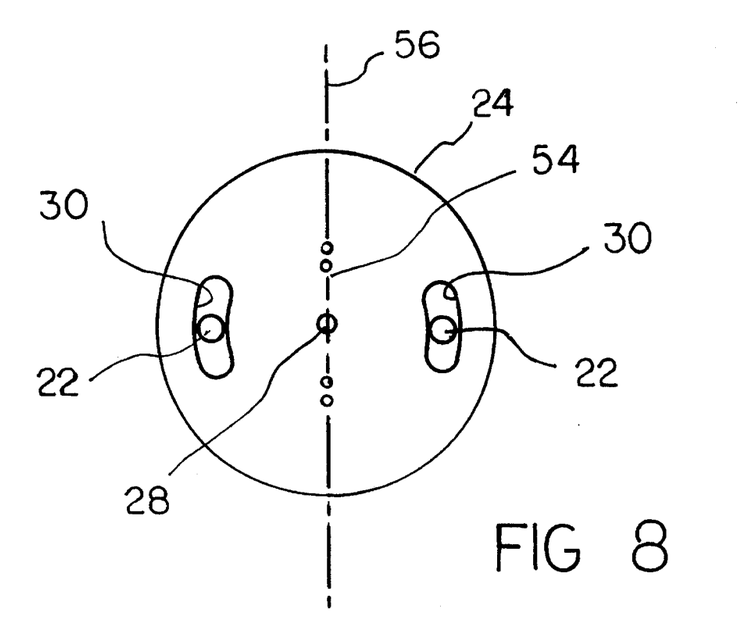
FIG. 8 is a top schematic view of the relative orientations of the longitudinal axis of the tractor, the longitudinal axis of the trailer, the lock pins, and the partially-ring-shaped slots when the trailer directly follows the tractor.
Figure 9:
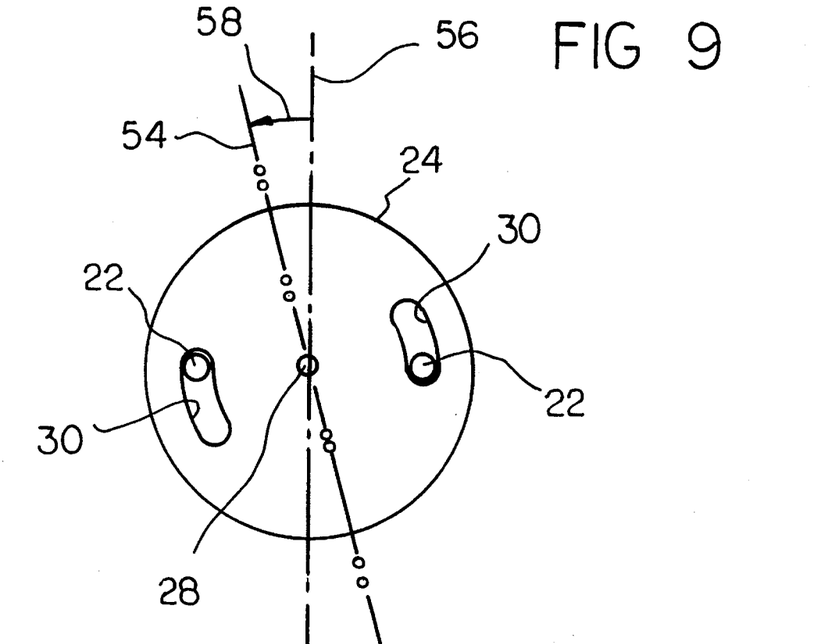
FIG. 9 is a top schematic view .of the relative orientations of the longitudinal axis of the tractor, the longitudinal axis of the trailer, the lock pins, and the partially-ring-shaped slots 30, when the trailer follows the tractor at a 15 degree angle counterclockwise from the longitudinal axis of the tractor.
Figure 10:
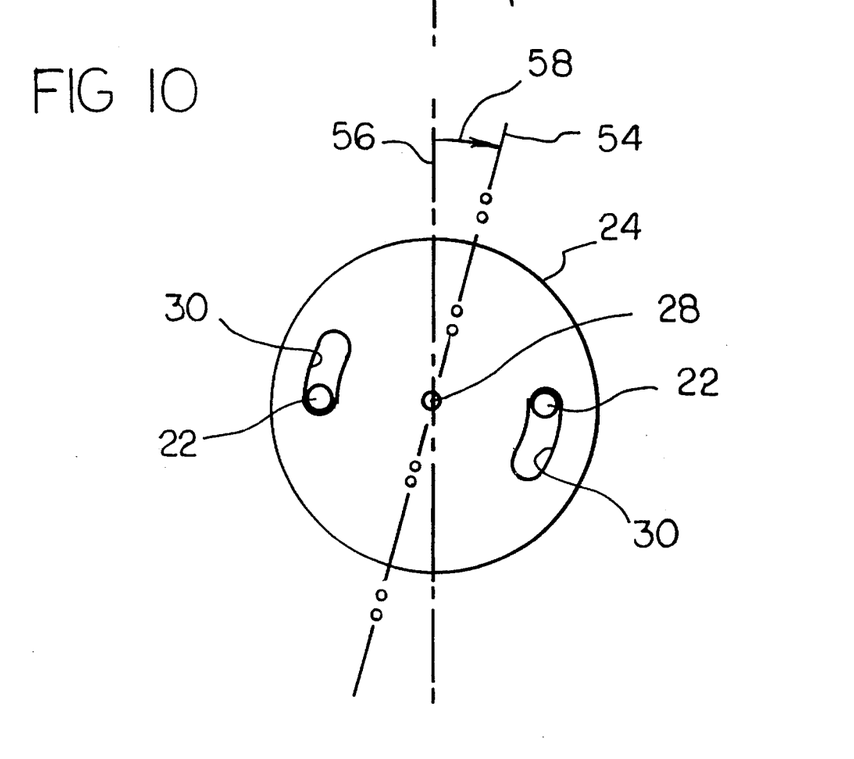
FIG. 10 is a top schematic view of the relative orientations of the longitudinal axis of the tractor, the longitudinal axis of the trailer, the lock pins, and the partially-ring-shaped slots when the trailer follows the tractor at a 15 degree angle clockwise from the longitudinal axis of the tractor.

As shown best in FIGS. 8–10, the partially-ting-shaped slots 30 are of a predetermined size and are oriented on the trailer 26 such that when the lock pins 22 of the locking pin assemblies 18 are in engagement with respective ends of the partially-ring-shaped slots 30, a longitudinal axis 54 of the trailer 26 is oriented no greater than an acute angle 58 of rotation either clockwise or counterclockwise from a longitudinal axis 56 of the tractor 14. The acute angle 58 of rotation between the longitudinal axis 54 of the trailer 26 and the longitudinal axis 56 of the tractor 14 is no greater than fifteen degrees.

Figure 1:
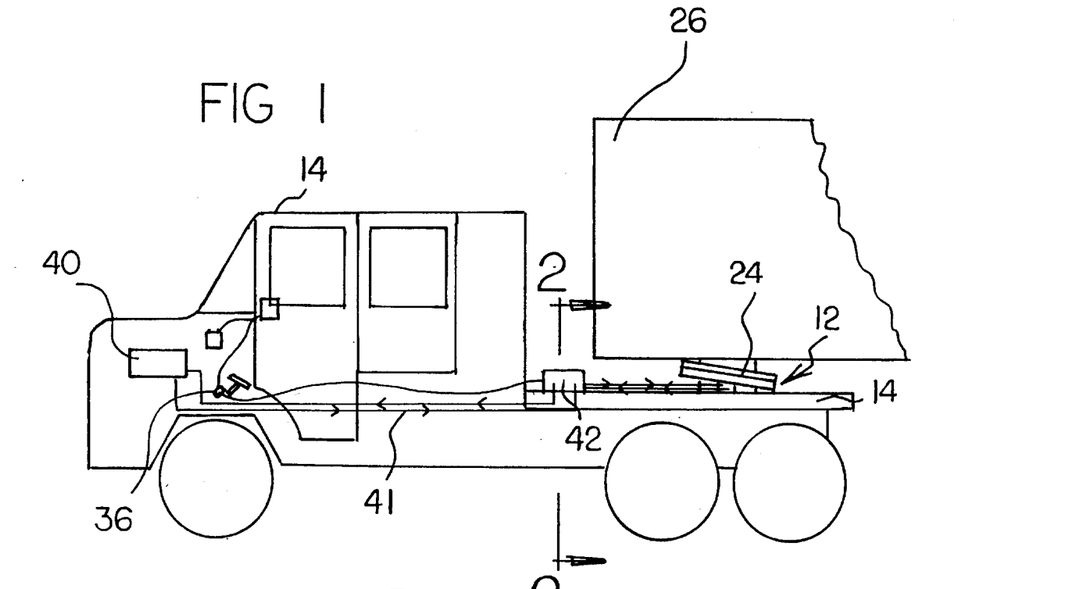
FIG. 1 is a side view showing a preferred embodiment of the anti-jackknife apparatus for tractor to trailer connections of the invention installed on a tractor and trailer.
Figure 2:
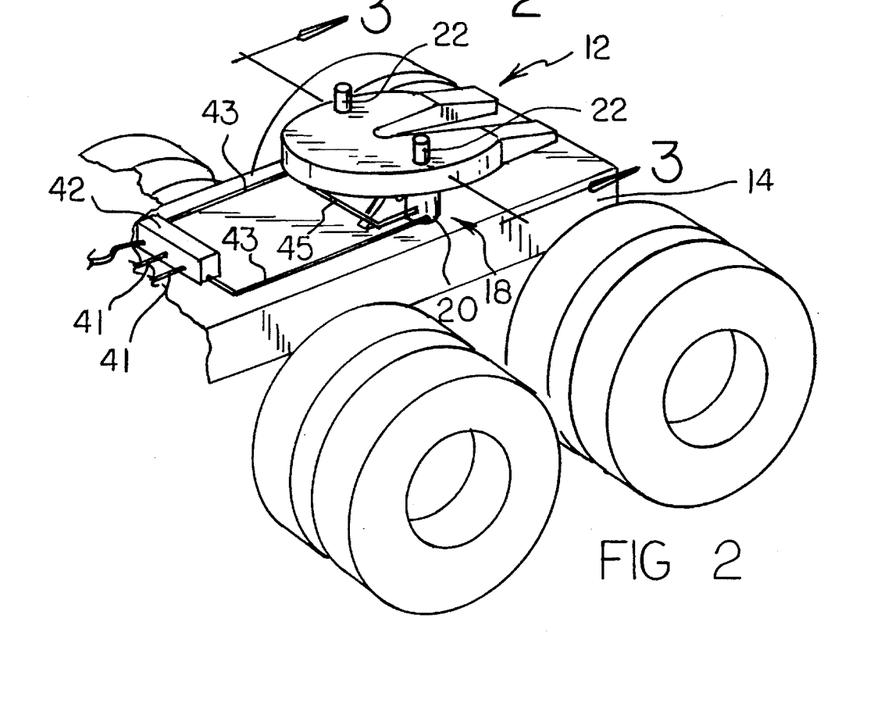
FIG. 2 is an enlarged partial perspective view of the rear portion of the tractor, taken along line 2—2 of FIG. 1, showing the fifth wheel of the embodiment of the invention shown in FIG. 1.
Figure 3:
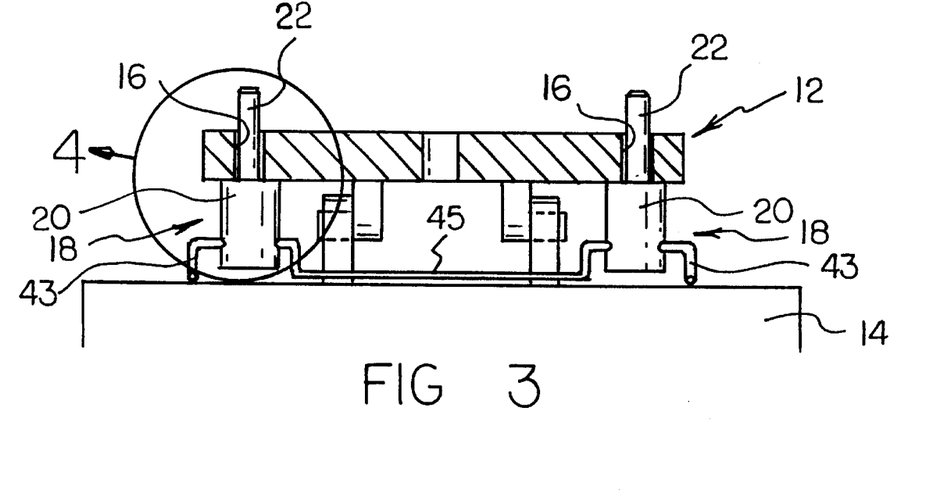
FIG. 3 is an enlarged cross-sectional view of the portion of the embodiment of the invention shown in FIG. 2 taken along line 3—3 of FIG. 2.
Figure 4:
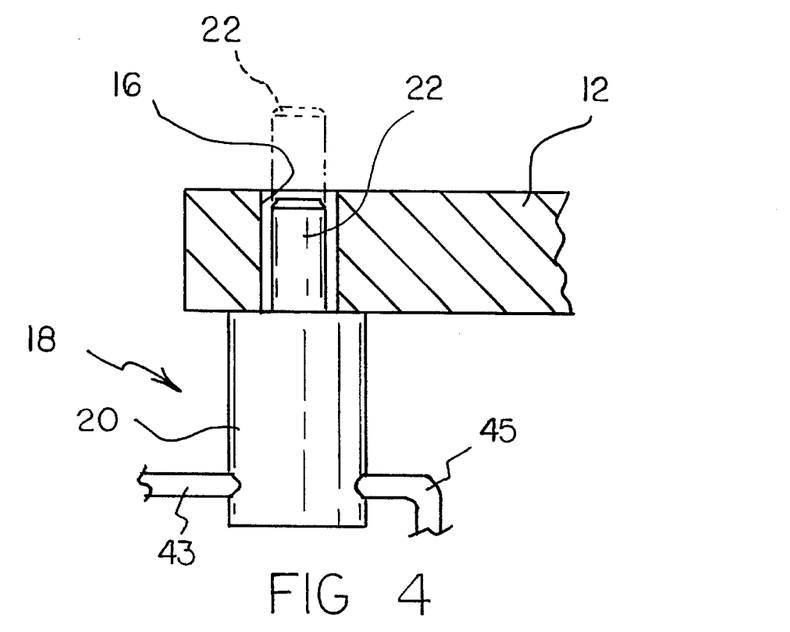
FIG. 4 is an enlarged cross-sectional view of the circled region 4 in the embodiment of the invention shown in FIG. 3 wherein a locking pin is shown in an extended position in broken lines and in a retracted position in solid lines.
Figure 5:
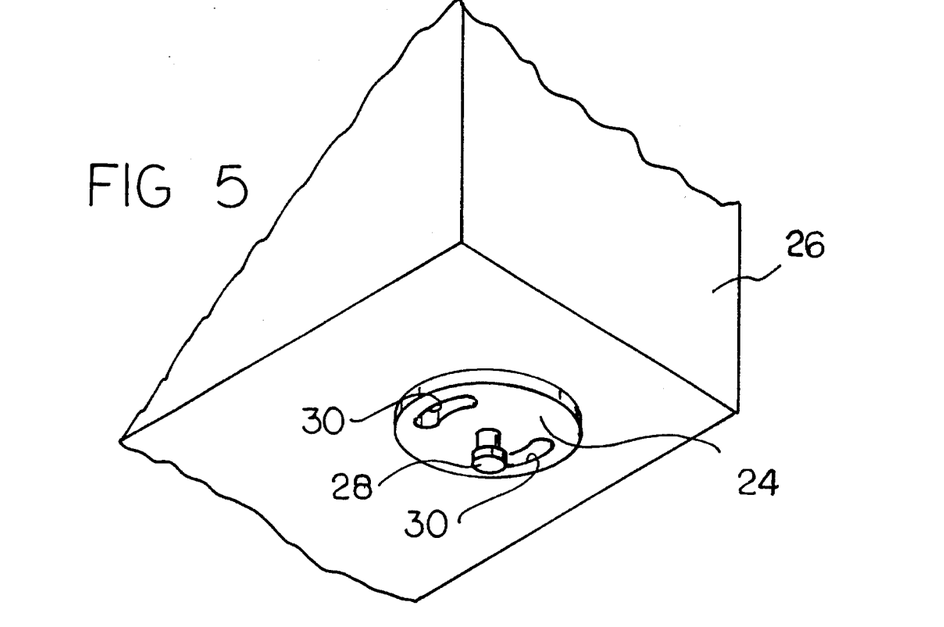
FIG. 5 is a bottom perspective view of a portion of the embodiment of the invention shown in FIG. 1 that is connected to the trailer.

The fifth wheel assembly 12 includes a pair of lock pin receiving apertures 16, and each of the locking pin assemblies 18 includes a housing assembly 20 that is connected to the fifth wheel assembly 12 and includes an extensible and retractable lock pin 22 that is capable of extending out from and retracting in toward the housing assembly 20. The housing assembly 20 is connected to the fifth wheel assembly 12, such as by welding, such that the lock pin 22 is placed in registration with a respective lock pin receiving aperture 16 on the fifth wheel assembly 12.

A hydraulic pump assembly 40, supported by the tractor 14, is driven by power from a tractor motor. Art electrically-controlled valve assembly 42 is controlled by the control assembly and is in hydraulic communication with the hydraulic pump assembly 40 through hydraulic lines 41, for providing hydraulic power from the hydraulic pump assembly 40 to the locking pin assemblies 18. Each of the locking pin assemblies 18 includes a hydraulically powered drive assembly housed within the housing assembly 20 for extending and retracting the respective lock pins 22. The hydraulically powered drive assembly housed within the housing assembly 20 can be a conventional hydraulic piston/cylinder combination. Hydraulic lines 43 run from the electrically-controlled valve assembly 42 to the locking pin assemblies 18. A pressure-equalizing hydraulic line 45 runs between the two locking pin assemblies 18.

The electrically-controlled valve assembly 42 includes a pair of first electrically-controlled valves 60, e.g. solenoid-controlled valves, for driving the lock pins 22 to the retracted position and includes a pair of second electrically-controlled valves 62, e.g. solenoid-controlled valves, for driving the lock pins 22 to the extended position.

The control assembly also includes a brake-pressure-responsive switch assembly 36 connected to a hydraulic line in a tractor brake system. The brake-pressure-responsive switch assembly 36 provides the first control signal in response to actuation of tractor brakes. A bypass switch assembly 34 is located in a tractor cab and provides the second control signal in response to manual actuation by a tractor driver. The brake-pressure-responsive switch assembly 36 can be the conventional brake light switch that is normally in-circuit with the brake lights. In this case, an auxiliary wire can run from the conventional brake light switch to the hydraulics control assembly of the invention. Alternatively, a separate and distinct brake-pressure-responsive switch assembly 36 can be installed in a brake line for the tractor 14 reset switch assembly 44 is located in the tractor cab and, when manually actuated, provides a reset signal for return of status of the apparatus from a bypass mode to a normal mode.

Figure 7:
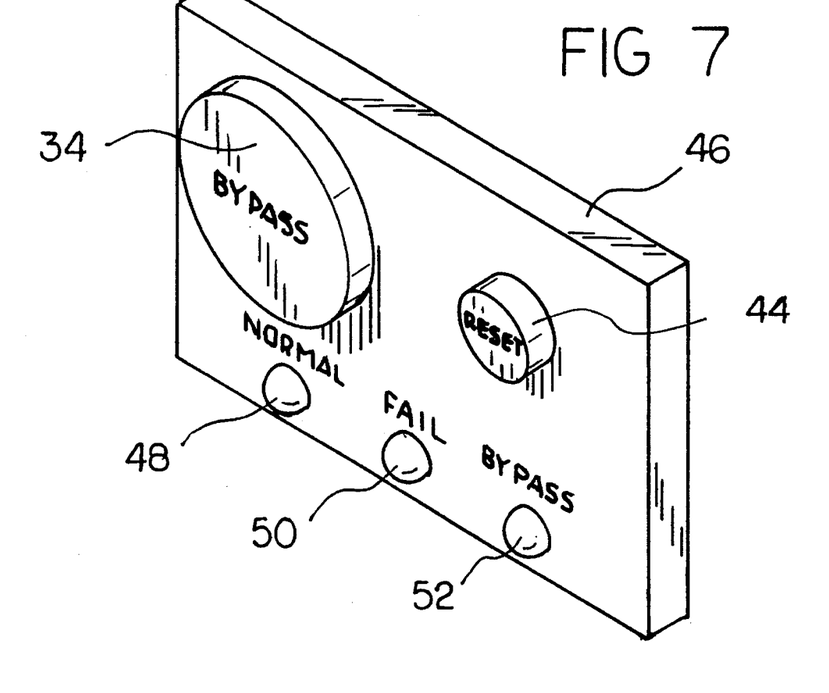
FIG. 7 is a perspective view of the front of the control panel used with the circuit shown in FIG. 6.

The bypass switch assembly 34 and the reset switch assembly 44 are located on a control panel 46 in the tractor cab. The control panel 46 also includes status lights for indicating the status of the anti-jackknife apparatus of the invention. More specifically, a first status light 48 is colored green and is lit to indicate that the anti-jackknife apparatus of the invention is in the normal status; that is, the hydraulic pressure put out by the hydraulic pump assembly 40 and maintained throughout the system is adequate for powering the locking pin assemblies 18. A second status light 50 is lit to indicate that the hydraulic pressure for powering the locking pin assemblies 18 has failed. A third status light 52 is lit to indicate that the circuitry for energizing the locking pin assemblies 18 and extending the lock pins 22 is bypassed so that the angle between the longitudinal axis 56 of the tractor 14 and the longitudinal axis 54 of the trailer 26 can be greater than 90 degrees such as when the tractor and trailer are parked or maneuvered to a loading dock.

In use, and with most specific reference to FIG. 6, with the motor of the tractor 14 running, the hydraulic pump assembly 40 develops hydraulic pressure. A pump pressure output sensor assembly 64 senses the hydraulic pressure developed by the hydraulic pump assembly 40 and moves up from the lower to the upper position shown in FIG. 6. When the pump pressure output sensor assembly 64 moves to its upper position, electric power from the tractor battery 66 can flow through first-relay-controlled switch 68 (which is normally in the closed position shown in FIG. 6 when the relay 70 is deenergized), and the electric power lights the first status light 48 which indicates that the hydraulic pressure in the system is normal. In contrast, when the hydraulic pressure in the system fails, the pump pressure output sensor assembly 64 drops to its lower position, and the first status light 48 turns off, and the second status light 50 is lit. The lighting of the second status light 50 is indicative of hydraulic pressure failure. The hydraulic pressure failure may be caused by an improper functioning hydraulic pump assembly 40 or broken hydraulic lines.

When the hydraulic pressure is adequate and when the brakes of .the tractor 14 are not applied, the brake-pressure-responsive switch assembly 36 is in the upper position shown in FIG. 6, and the first electrically-controlled valves 60 which maintain the lock pins 22 in the retracted position are actuated by electric power received from the battery 66. On the other hand, when the brakes of the tractor 14 are applied, the brake-pressure-responsive switch assembly 36 is moved to the lower position shown in FIG. 6. This provides the first control signal. Then, electric power flows from the battery 66, through the lower-position brake-pressure-responsive switch assembly 36, through the second-relay-controlled switch 72 (which is normally in the closed position shown in FIG. 6 when the relay 70 is deenergized), and to the second electrically-controlled valves 62 which drive the lock pins 22 to the extended position. It is also noted that when the brake-pressure-responsive switch assembly 36 is moved to the lower position, the circuit to the first electrically-controlled valves 60 is broken, and the first electrically-controlled valves 60 are deenergized. Thus, during normal operation of the brakes of the tractor 14, the lock pins 22 of the locking pin assemblies 18 are driven to the extended position when the driver of the tractor 14 applies the tractor brakes. Normally, then, every time the tractor brakes are applied, the lock pins 22 are extended into the partially-ring-shaped slob 30 of the trailer plate 24 so that if a potential jackknife condition were about to occur, either a clockwise jackknife or a counterclockwise jackknife, as the longitudinal axis 54 of the trailer 26 swings into an acute angle 58 with respect to the longitudinal axis 56 of the tractor 14, the two lock pins 22 would contact two ends of the partially-ring-shaped slots 30 to prevent the acute angle 58 from exceeding the predetermined limit, e.g. 15 degrees, provided by the partially-ring-shaped slots 30.

However, when the tractor and trailer are to be parked or maneuvered into a loading dock, the angle between the longitudinal axis 56 of the tractor. 14 and the longitudinal axis 54 of the trailer 26 may need to be greater than the predetermined acute angle 58 limited, by the partially-ting-shaped slots 30. In such a case, the lock pins 22 must be maintained in a retracted position even though the brake pedal of the tractor 14 is pressed by the tractor driver. In such a case, the driver of the tractor 14 actuates the bypass switch assembly 34. This provides the second control signal. The bypass switch assembly 34 is a momentary closure switch, and, when the bypass switch assembly 34 is actuated, electric power flows from the battery 66 to the relay 70 causing the relay 70 to be energized. As a result, the third-relay-controlled switch 74 is moved from the normally open position shown in FIG. 6 to a closed position. With the third-relay-controlled switch 74 in tile closed position, electric power flows from the battery 66, through the closed third-relay-controlled switch 74, and through the relay 70. In addition, electric power flows through the third status light 52 which indicates the activation of the bypass switch assembly 34.

With the relay 70 activated in the bypass mode, the first-relay-controlled switch 68 is moved to an open position, and the first status light 48 indicating the status of the hydraulic pressure rams off. Also, with the relay 70 activated, the second-relay-controlled switch 72 moves from a closed to an open position. With the second-relay-controlled switch 72 in an open position, electric power is prevented from reaching the second electrically-controlled valves 62 which cause the lock pins 22 to be extended. In the bypass mode, even though the brake-pressure-responsive switch assembly 36 may be moved to lower position when the brakes of the tractor 14 are applied, the open status of the second-relay-controlled switch 72 prevents the second electrically-controlled valves 62 from extending the lock pins 22 of the locking pin assemblies 18. Therefore, in the bypass mode, the tractor and trailer can be maneuvered, with or without the brakes being used, without interference from the locking pin assemblies 18 and the partially-ring-shaped slots 30 of the invention.

After the tractor and trailer have been maneuvered in the bypass mode, resumption of the normal mode of operation takes place by a momentary pressing of the reset switch assembly 44. Without pressing the reset switch assembly 44, the reset switch assembly 44 is normally dosed and permits electric power to flow from the battery 66, through the reset switch assembly 44, through the third-relay-controlled switch 74, through the relay 70, and through the third status light 52 indicating the bypass mode status.

On the other hand, when the reset switch assembly 44 is momentarily pressed, the circuit is broken, and electric power no longer flows from the battery 66 to the relay 70. As a result, the relay 70 is deenergized, and the relay-controlled switches return to the normally deenergized state. That is, the first-relay-controlled switch 68 returns to its normally closed state permitting lighting of the first status light 48 for indicating normal hydraulic pressure. The second-relay-controlled switch 72 returns to the normally closed position permitting activation of the second electrically-controlled valves 62 for extending the lock pins 22 when the brake-pressure-responsive switch assembly 36 is activated. The third-relay-controlled switch 74 returns to a normally open orientation preventing actuation of the relay 70 unless the bypass switch assembly 34 is pressed and preventing lighting of the third status light 52 for the bypass mode.

The components of the anti-jackknife apparatus for tractor to trailer connections of the invention can be made from inexpensive and durable metal and plastic materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved anti-jackknife apparatus for tractor to trailer connections that is low in cost, relatively simple in design and operation, and which may advantageously be used without maintaining a tractor and trailer in a straight-line orientation. With the invention, an anti-jackknife apparatus for tractor to trailer connections is provided which does not depend upon a high coefficient of friction between two braking surfaces for proper operation. With the invention, an anti-jackknife apparatus for tractor to trailer connections is provided which is mostly carried by the tractor as opposed to the trailer. With the invention, an anti-jackknife apparatus for tractor to trailer connections is provided which does not depend upon a specific alignment between a tractor and a trailer to be present when the brakes are applied. With the invention, an anti-jackknife apparatus for tractor to trailer connections is provided which is operable when the tractor and trailer are riding on a curve in the road. With the invention, an anti-jackknife apparatus for tractor to trailer connections is provided which spreads anti-jackknifing forces to both a right side and a left side in a redundant manner whether the jackknife would occur to the right side or the left side. With the invention, an anti-jackknife apparatus for tractor to trailer connections is provided which can be bypassed when the tractor and trailer are being maneuvered to a loading area. With the invention, an anti-jackknife apparatus for tractor to trailer connections is provided in which enabling or disabling the anti-jackknife apparatus is easily accomplished by the tractor driver with the mere actuation of an electrical switch.

With respect to the above description, it should be realized that the optimum dimensional relationships for the parts of the invention, to include variations in size, form function and manner of operation, assembly and use, are deemed readily apparent and obvious to those skilled in the art, and therefore, all relationships equivalent to those illustrated in the drawings and described in the specification are intended to be encompassed only by the scope of appended claims.

While the present invention has been shown in the drawings and fully described above with particularity and detail in connection with what is presently deemed to be the most practical and preferred embodiments of the invention, it will be apparent to those of ordinary skill in the art that many modifications thereof may be made without departing from the principles and concepts set forth herein. Hence, the proper scope of the present invention should be determined only by the broadest interpretation of the appended claims so as to encompass all such modifications and equivalents.

What is claimed as being new and desired to be protected by Letters Patent of the United States is as follows:

1. A new and improved anti-jackknife apparatus in combination with a tractor and a trailer having tractor to trailer connections, wherein the tractor has a brake system which include an hydraulic line, wherein the tractor has a motor and a cab, and wherein the trailer has a downwardly extending kingpin, comprising:

a fifth wheel assembly connected to the tractor, a pair of locking pin assemblies connected to said fifth wheel assembly, each of said locking pin assemblies including an extensible and retractable lock pin, a control assembly connected to said pair of locking pin assemblies, wherein said control assembly is capable of being controlled by a first control signal in response to actuation of the tractor brake system and is capable of being controlled by a second control signal in response to manual actuation of a bypass switch assembly by a tractor driver, a plate connected to the trailer such that said trailer plate encircles the kingpin extending downward from the trailer, said trailer plate including a pair of partially-ring-shaped slots adapted to receive said lock pins of said locking pin assemblies when said lock pins are in an extended position, a hydraulic pump assembly, supported by the tractor, which is driven by power from the tractor motor, and an electrically-controlled valve assembly, controlled by said control assembly and in hydraulic communication with said hydraulic pump assembly, for providing hydraulic power from said hydraulic pump assembly to said locking pin assemblies, wherein said locking pin assemblies include a hydraulically powered drive assembly housed within said housing assembly for extending and retracting said respective lock pins, and wherein said fifth wheel assembly includes a pair of lock pin receiving apertures, and wherein each of said locking pin assemblies includes a housing assembly connected to said fifth wheel assembly and includes an extensible and retractable lock pin that is capable of extending out from and retracting in toward said housing assembly, said housing assembly being connected to said fifth wheel assembly such that said lock pin is placed in registration with a respective lock pin receiving aperture on said fifth wheel assembly.

2. The apparatus described in claim 1 wherein said partially-ring-shaped slots are of a predetermined size and are oriented on the trailer such that when said lock pins of said locking pin assemblies are in engagement with respective ends of said partially-ring-shaped slots, a longitudinal axis of the trailer is oriented no greater than an acute angle of rotation either clockwise or counterclockwise from a longitudinal axis of the tractor.

3. The apparatus described in claim 2 wherein said acute angle of rotation between said longitudinal axis of the trailer and the longitudinal axis of the tractor is no greater than fifteen degrees.

4. The apparatus described in claim 1 wherein said electrically-controlled valve assembly includes:

a pair of first electrically-controlled valves for driving said lock pins to the retracted position, and a pair of second electrically-controlled valves for driving said lock pins to the extended position.

5. The apparatus described in claim 1 wherein said control assembly includes:

a brake-pressure-responsive switch assembly, connected to a hydraulic line in the tractor brake system, which provides said first control signal in response to actuation of the tractor brake system, and a bypass switch assembly located in the tractor cab which provides said second control signal in response to manual actuation by a tractor driver.

6. The apparatus described in claim 5, further including:

a reset switch assembly located in the tractor cab which, when manually actuated, provides a reset signal for return of status of the apparatus from a bypass mode to a normal mode.

\* \* \* \* \*